(12) United States Patent
Döring

(10) Patent No.: US 9,714,593 B2
(45) Date of Patent: Jul. 25, 2017

(54) EXHAUST GAS AFTERTREATMENT SYSTEM FOR A VEHICLE OPERATED BY MEANS OF A COMBUSTION ENGINE, IN PARTICULAR FOR A WATERCRAFT

(71) Applicant: MAN Truck & Bus AG, München (DE)

(72) Inventor: Andreas Döring, München (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/957,839

(22) Filed: Dec. 3, 2015

(65) Prior Publication Data

US 2016/0160722 A1    Jun. 9, 2016

(30) Foreign Application Priority Data

Dec. 3, 2014   (DE) .................. 10 2014 017 790

(51) Int. Cl.
| | |
|---|---|
| *F01N 3/00* | (2006.01) |
| *F01N 3/08* | (2006.01) |
| *F01N 3/20* | (2006.01) |
| *F01N 9/00* | (2006.01) |

(52) U.S. Cl.
CPC .......... *F01N 3/085* (2013.01); *F01N 3/0814* (2013.01); *F01N 3/0885* (2013.01); *F01N 3/2066* (2013.01); *F01N 9/005* (2013.01); *F01N 2340/06* (2013.01); *F01N 2570/04* (2013.01); *F01N 2590/02* (2013.01); *F01N 2610/02* (2013.01); *F01N 2900/1622* (2013.01); *Y02T 10/24* (2013.01)

(58) Field of Classification Search
USPC .......... 60/274, 280, 286, 295, 297, 303, 311
See application file for complete search history.

(56) References Cited

U.S. PATENT DOCUMENTS

| | | | | |
|---|---|---|---|---|
| 6,829,891 | B2* | 12/2004 | Kato .................... | F01N 3/0835 60/295 |
| 8,065,990 | B2* | 11/2011 | Brusstar ............. | F02D 41/0072 123/568.11 |
| 8,443,592 | B2* | 5/2013 | Asanuma ................ | F01M 1/10 423/239.1 |
| 2008/0202101 | A1* | 8/2008 | Driscoll .................. | F01N 3/035 60/286 |
| 2015/0285114 | A1* | 10/2015 | Doring ................ | B01D 53/944 423/213.7 |

FOREIGN PATENT DOCUMENTS

| | | | |
|---|---|---|---|
| DE | 199 55 324 A1 | 5/2001 | |
| WO | WO2014169967 | * 10/2014 | .......... F01N 3/0233 |

* cited by examiner

*Primary Examiner* — Binh Q Tran
(74) *Attorney, Agent, or Firm* — Lucas & Mercanti, LLP

(57) ABSTRACT

An exhaust gas aftertreatment system for a vehicle operated by a combustion engine, in particular for a watercraft, includes a turbine of an exhaust turbocharger in an exhaust line, and at least one storage device, by which at least some of the sulphur pollutants contained in the exhaust gas can be stored and/or put into intermediate storage, at least for a defined period of time. According to the invention, particularly for storing the sulphur pollutants in the high-pressure region, the at least one storage device is arranged in the exhaust line upstream of the at least one turbine in a high pressure region of the exhaust line.

24 Claims, 10 Drawing Sheets

EXHAUST GAS AFTERTREATMENT SYSTEM FOR A VEHICLE OPERATED BY MEANS OF A COMBUSTION ENGINE, IN PARTICULAR FOR A WATERCRAFT

CROSS-REFERENCE TO RELATED APPLICATIONS

This application claims the priority of DE 10 2014 017 790.4, filed on Dec. 3, 2014, which is incorporated herein in its entirety by reference.

BACKGROUND OF THE INVENTION

The invention relates to an exhaust gas aftertreatment system for a vehicle operated by a combustion engine, in particular for a watercraft, to a method for operating an exhaust gas aftertreatment system for a vehicle operated by a combustion engine, in particular for a watercraft, and to a vehicle, in particular a watercraft, having the exhaust gas aftertreatment system and/or for carrying out the method.

Owing to ever stricter exhaust regulations for vehicles and especially also for ships, it is necessary also to reduce the sulphur emissions, e.g., sulphur dioxide, from vehicles operated by combustion engines.

In plant engineering, there is already a known practice of desulphurizing emissions from combustion engines by feeding an aqueous calcium hydroxide solution or calcium oxide solution into the exhaust gas from the combustion engine. By these solutions, the sulphur emissions react to form harmless calcium sulphate. However, using this type of desulphurization on vehicles is difficult owing to the large amount of space which it requires. If a Selective Catalytic Reduction (SCR) catalyst is additionally arranged in the exhaust line of the vehicle downstream of the infeed of calcium hydroxide or calcium oxide, as seen in the direction of flow of the exhaust gas, to reduce the nitrogen emissions from the vehicle, there is the additional problem that calcium compounds come into contact with the SCR catalyst. There, they act as powerful catalyst poisons which significantly reduce the life of the SCR catalyst. Moreover, calcium hydroxide, calcium oxide and calcium sulphate can also have a powerful abrasive action and thus lead to increased wear on individual components of the exhaust line.

In plant engineering, there is furthermore a known practice of desulphurizing the emissions from combustion engines by feeding ammonia into the exhaust gas. By the ammonia, the sulphur pollutants react to form easily decomposed salts, e.g., ammonium sulphate and ammonium hydrogen sulphate, which are then filtered out of the exhaust gas by suitable filters. However, this type of desulphurization requires complex processes, which are difficult to implement especially in vehicles, since ammonium sulphate or ammonium hydrogen sulphate forms only at temperatures below 300° C. and the exhaust gas from the combustion engine is generally at a significantly higher temperature.

Devices for desulphurizing the exhaust gas are furthermore also already known on vehicles. A device for reducing harmful components in the exhaust gas from a combustion engine, in which, in a preferred embodiment, a "sulphur trap" is arranged in an exhaust line of the vehicle, is disclosed by DE 199 55 324 A1, for example. This sulphur trap reduces the sulphur content of the exhaust gas to ensure the operation of an $NO_x$ storage catalyst arranged in the exhaust line downstream of the sulphur trap, as seen in the direction of flow of the exhaust gas, and, where applicable, of a particulate filter likewise arranged downstream. Here, regeneration of the sulphur trap is accomplished by measures in the engine, e.g., by changing the intake air throttling, the injection or the exhaust gas recirculation rate. Here, the sulphur trap is arranged in the exhaust line downstream of an exhaust turbocharger.

BRIEF SUMMARY OF THE INVENTION

An object of the invention to provide an exhaust gas aftertreatment system for a vehicle operated by a combustion engine, in particular for a watercraft, and a method for operating an exhaust gas aftertreatment system for a vehicle operated by a combustion engine, in particular for a watercraft, by which the sulphur emissions from the combustion engine are reduced in a particularly simple and effective manner.

According to a first embodiment, an exhaust gas aftertreatment system for a vehicle operated by a combustion engine, in particular for a watercraft, includes at least one turbine, arranged in an exhaust line, of an exhaust turbocharger, wherein the exhaust line is designed as a high-pressure region upstream of the turbine and as a low-pressure region downstream of the turbine, as seen in the direction of the exhaust gas flow, said low-pressure region being at a lower pressure than the high-pressure region, and having at least one storage device, by which at least some of the sulphur pollutants, in particular gaseous sulphur pollutants, contained in the exhaust gas can be stored and/or put into intermediate storage, at least for a defined period of time. According to the embodiment, particularly for storing the sulphur pollutants in the high-pressure region, the at least one storage device is arranged in the exhaust line upstream of the at least one turbine.

In this way, the sulphur emissions from the combustion engine are reduced in a particularly effective manner since, if the storage device is designed as a sorption element, for example, said element being explained in greater detail below, the arrangement of the sorption element in the high-pressure region allows accelerated storage of the sulphur pollutants and the storage of a larger quantity of sulphur pollutants. If desulphurization is accomplished, for example, by feeding ammonia into the exhaust gas as already explained, this effective method of desulphurization can be implemented in a particularly simple and low-cost way by the arrangement according to the invention since, as explained in greater detail below, the ammonium sulphate and the ammonium hydrogen sulphate are formed despite the high temperature of the exhaust gas, owing to the relatively high pressure in the high-pressure region. The arrangement according to the embodiment of the invention of the storage device in the high-pressure region upstream of the at least one turbine is therefore a particularly simple measure by which the effectiveness of reduction of sulphur pollutants can be enhanced. Owing to the backpressure effect of the at least one turbine, the pressure in the high-pressure region can be in the region of about 0.8 MPa, while the pressure in the low-pressure region is only about 0.1 MPa.

In a further embodiment of the exhaust gas aftertreatment system according to the invention, the storage device is designed as the sorption element already mentioned, by which the sulphur pollutants can be sorbed. By the sorption element, the sulphur pollutants can be stored or put into intermediate storage in a particularly simple manner. As a particularly preferred option, the storage device designed as a sorption element is produced from a sorption material, in particular from a zeolite and/or from calcium and/or from barium. As an alternative, the storage device designed as a sorption element can also be a component which is coated with the sorption material.

As another alternative and/or in addition to the design of the storage device as a sorption element, it is also possible to provide a feed device, by which the exhaust gas upstream of the at least one storage device can be supplied with a reagent stored in a storage container, by which the sulphur pollutants contained in the exhaust gas can be converted into solids, in particular into easily decomposable salts. The storage device is then designed as a filter element, by which the sulphur pollutants converted into solids can be filtered out of the exhaust gas flow and stored. As already mentioned, the conversion of the sulphur pollutants in the exhaust gas into solids and the subsequent filtering of these solids out of the exhaust gas flow are a particularly effective method of storing the sulphur pollutants contained in the exhaust gas since the sulphur pollutants are converted into solids or particles, and these solids can then be collected easily by the storage device designed as a filter element. Moreover, it is also ensured by this method that only the sulphur pollutants are stored in the storage device. Other substances in the exhaust gas, in particular gaseous substances, can simply pass through the storage device designed as a filter element. Thus, the storage capacity of the storage device is also not negatively affected by other substances contained in the exhaust gas.

The reagent is preferably ammonia or a precursor of ammonia, in particular an aqueous urea solution. The ammonia causes the sulphur pollutants contained in the exhaust gas then react, as already mentioned, to form the solids ammonium sulphate and ammonium hydrogen sulphate, for example. Here, this reaction takes place, as likewise already mentioned, despite the high temperatures of the exhaust gas since the ammonia is fed into the exhaust gas from the combustion engine in the high-pressure region upstream of the turbine. Owing to the higher pressure in the high-pressure region, there is a shift in the chemical equilibrium of the reaction equations for the formation of the solids ammonium sulphate and ammonium hydrogen sulphate from ammonia and the sulphur pollutants to the side or in the direction of ammonium sulphate and ammonium hydrogen sulphate. Here, the quantity of ammonia to be fed in is preferably controlled in a self-acting or automatic way by a control device, preferably in accordance with at least one parameter, e.g., with the sulphur content of the fuel, the current combustion air ratio, and/or the currently fed-back quantity of exhaust gas in an exhaust gas recirculation system of the vehicle. As a particularly preferred option, at least one SCR catalyst, which can likewise be fed by a feed device with the reagent formed in this way, is also arranged in the exhaust line. In this way the ammonia or the precursor of ammonia can also be used to reduce nitrogen emissions in the exhaust gas.

The at least one storage device is preferably designed as an SCR catalyst. Thus, ammonia which is used for the conversion of the sulphur pollutants but is not completely used up during this process can be used to reduce the nitrogen emissions from the combustion engine. As a result, the ammonia employed is completely used up and the ammonia emissions from the vehicle are reduced in a simple and reliable manner. Moreover, the formation of highly explosive ammonium nitrate in the exhaust line is also avoided since the $NO_2$ required for this is used up in the SCR reaction. In order to increase the effectiveness of the SCR reaction, the storage device is designed with narrow flow channels.

As an alternative and/or in addition, the at least one SCR catalyst can be arranged in the exhaust line downstream of the storage device. In this case, a single feed region for feeding the reagent for the storage device and the SCR catalyst into the exhaust gas is preferably provided, in particular a feed region arranged in the exhaust line upstream of the turbine and/or of the storage device. In this way, feeding in is significantly simplified since the reagent is introduced into the exhaust line or fed into the exhaust gas only at a single location in the exhaust line. Arranging the feed region upstream of the turbine and/or of the storage device is advantageous here since the exhaust gas mixed with reagent then does not have to be delivered from the low-pressure region to the high-pressure region using complex delivery measures.

In another embodiment, the storage device can be arranged in an exhaust gas recirculation system of the exhaust line, by which some of the exhaust gas emitted by the combustion engine can be fed back to the combustion engine. It is thereby possible to provide or use an exhaust gas recirculation system even when operating the combustion engine with high-sulphur fuels, as is customary with watercraft, for example. This is because the sulphur dioxide which forms during the combustion of the high-sulphur fuels and the sulphuric acid or sulphurous acid which forms from the sulphur dioxide in the exhaust gas recirculation system, which is usually cooled, generally lead to severe corrosion of individual components of the combustion engine, e.g., the charge air pipe, the inlet valves, or the cylinder liners, and therefore an exhaust gas recirculation system is usually omitted if the combustion engine is operated with high-sulphur fuels. If the storage of the sulphur pollutants in the storage device is accomplished by converting the sulphur pollutants into solids by ammonia, the solids decompose in the combustion chamber of the combustion engine if they pass through the storage device and into the combustion chamber. It is thus possible to prevent increased abrasion on individual components of the combustion engine, e.g., on the cylinder liners, due to the solids. As an alternative and/or in addition, it is also possible for the storage device to be arranged in the exhaust line upstream of the exhaust gas recirculation system.

In a particularly preferred embodiment, an extraction device is provided that extracts and/or removes the stored sulphur pollutants from the exhaust line, wherein the extracted and/or removed sulphur pollutants can be fed to a reactor device, in which the sulphur pollutants can be converted into defined substances, in particular harmless substances. The extraction device and the reactor device regenerate the storage devices if they have already stored a large quantity of sulphur pollutants. Here, the use of the extraction device and of the reactor device is a particularly simple and, at the same time, effective method of converting the sulphur pollutants into harmless substances since this conversion takes place outside the exhaust line. Thus, the ambient conditions required for this conversion can be set and/or established in a significantly simpler way and selectively in the reactor device arranged outside the exhaust line.

Specifically, the exhaust line can have two exhaust line parts, for example, through which the exhaust gas flows in parallel, wherein at least one storage device is arranged in each of said exhaust line parts. For fluidic decoupling of the exhaust line parts from the exhaust gas flow, the extraction device then has a decoupling valve device, which decouples neither of the two exhaust line parts in a first valve position, decouples a first of the two exhaust line parts in a second valve position, while the second of the two exhaust line parts is not decoupled, and decouples the second of the two exhaust line parts in a third valve position, while the first of the two exhaust line parts is not decoupled. Fluidically decoupling the exhaust line parts significantly simplifies the extraction or removal of the stored sulphur pollutants from the exhaust line. Moreover, the decoupling of no more than one of the two exhaust line parts ensures that the exhaust gas can continue to flow through the exhaust line. Of course, it is also possible to provide more than two such exhaust line parts. All that is required in this case is that at least one of said exhaust line parts always remains coupled and allows a flow of exhaust gas.

Furthermore, the extraction device can have at least one relief valve device, by which the exhaust line parts can be relieved of pressure, wherein one relief valve device relieves neither of the two exhaust line parts in a first valve position, relieves the first of the two exhaust line parts in a second valve position, while the second of the two exhaust line parts is not relieved, and relieves the second of the two exhaust line parts in a third valve position, while the first of the two exhaust line parts is not relieved. By the relief valve device, the sulphur pollutants stored in the storage device can be removed or released again from the storage device in a particularly simple manner. Thus, for example, in the case of the storage device designed as a sorption element, the sorbed sulphur pollutants can simply be desorbed again after pressure relief. In the case of the storage device designed as a filter element, by which sulphur pollutants converted into solids are filtered out of the exhaust gas flow and stored, the solids are converted back into the gaseous sulphur pollutants after pressure relief, and the sulphur pollutants are released again from the storage device.

Furthermore, the extraction device can have at least one connecting element fluidically connecting the exhaust line parts to the reactor device upstream of the storage device. The connecting element is then assigned a connecting valve device, which shuts off the exhaust gas flow through the connecting element in a first valve position, enables the exhaust gas flow from the first of the two exhaust line parts towards the reactor device in a second valve position, while the exhaust gas flow from the second of the two exhaust line parts towards the reactor device is shut off, and enables the exhaust gas flow from the second of the two exhaust line parts towards the reactor device in a third valve position, while the exhaust gas flow from the first of the two exhaust line parts towards the reactor device is shut off. By the connecting element, the sulphur pollutants can be fed to the reactor device in a simple and reliable manner.

The extraction device furthermore has a bypass device fluidically connecting the exhaust line parts to one another downstream of the storage devices and upstream of a connecting region of the exhaust line parts. The bypass device is then assigned a bypass valve device, which shuts off the exhaust gas flow through the bypass device in a first valve position and at least partially enables the exhaust gas flow through the bypass device in a second valve position. By the bypass device, the sulphur pollutants released or removed from the storage device can be fed to the reactor device in a particularly simple manner since they are then taken along by the exhaust gas flow flowing through the bypass device. The hot exhaust gas already purged of sulphur pollutants furthermore allows particularly rapid and effective release or removal of the sulphur pollutants from the storage device.

In another embodiment, the extraction device has at least one delivery device, in particular a pump, by which the exhaust gas can be delivered from the exhaust line parts to the reactor device via the at least one connecting element. The at least one delivery device ensures reliable delivery of the sulphur pollutants.

Specifically, the reactor device for converting the sulphur pollutants can have a pollutant scrubber. As a scrubbing agent, an aqueous calcium hydroxide solution or calcium oxide solution can be used here, for example. As an alternative and/or in addition, the reactor device for converting the sulphur pollutants can also have a fixed bed reaction element. Here, this fixed bed reaction element can be produced from calcium hydroxide or calcium oxide, for example. As another alternative, the reactor device for converting the sulphur pollutants can have a cooling device and a condensation device for cooling and condensing the sulphur pollutants. In this way, the sulphur pollutants are then oxidized to sulphuric acid. Precipitation of condensate by the cooling device and of the condensation device leads to the formation of sulphurous acid and sulphur dioxide, which are then oxidized with oxygen to give sulphuric acid. To improve oxidation, a feed device is preferably provided here, by which oxygen can be fed to the cooling device and/or to the condensation device. Moreover, the oxidation of the sulphurous acid can preferably be improved by a suitable catalyst, in particular a catalyst containing vanadium and/or cerium and/or an alkali and/or alkaline earth metal.

In yet another embodiment, a bypass device is provided, by which the reagent separated from the sulphur pollutants and removed from the exhaust line can be fed back to the exhaust gas upstream of the at least one storage device. In this way, the sulphur pollutants can be stored in the storage device in a particularly effective manner since the reagent required for this purpose can be reused.

A measurement and/or control device is furthermore preferably provided, by which the quantity of sulphur pollutants stored in the at least one storage device can be determined, wherein the measurement and/or control device includes a sensor system and/or a simulation model for determining the quantity of sulphur pollutants stored in the storage device. By the measurement and/or control device, it is possible, for example, to determine when the storage device has to be regenerated or whether regeneration has been successful.

The object of the invention is also met by a method for operating an exhaust gas aftertreatment system for a vehicle operated by a combustion engine, in particular for a watercraft, wherein the exhaust gas aftertreatment system has at least one turbine, arranged in an exhaust line, of an exhaust turbocharger and at least one storage device, wherein the exhaust line is designed as a high-pressure region upstream of the turbine and as a low-pressure region downstream of the turbine, as seen in the direction of the exhaust gas flow, said low-pressure region being at a lower pressure than the high-pressure region, and wherein at least some of the sulphur pollutants contained in the exhaust gas can be stored and/or put into intermediate storage, at least for a defined period of time, by the storage device. According to the invention, the at least one storage device is arranged in the exhaust line upstream of the at least one turbine, with the result that the sulphur pollutants are stored and/or put into intermediate storage in the high-pressure region of the exhaust line.

The advantages resulting from the method according to the invention are identical with the advantages, already explained, of the exhaust gas aftertreatment system according to the invention, and therefore they will not be repeated here.

In a preferred procedure, the decoupling valve device, the relief valve device, and the connecting valve device are in their first valve positions in an initial position usually employed during the operation of the combustion engine. To regenerate the storage device of one of the two exhaust line parts, the decoupling valve device, the relief valve device and the connecting valve device are then controlled in such a way by a closed-loop and/or open-loop control device that the exhaust line part is initially decoupled from the exhaust gas flow by the decoupling valve device, that the exhaust line part is then relieved of pressure by the relief valve device, and that finally the mass flow from the exhaust line part towards the reactor device is enabled by the connecting valve device. In this way, the sulphur pollutants in the exhaust gas are thus put into intermediate storage in the storage devices for a defined period of time in the initial position of the valve devices. To regenerate the at least one storage device of one of the two exhaust line parts, the valve devices are then switched over for a defined period of time in the manner explained. After regeneration, the valve devices can then be switched back into their initial position.

If the bypass device is provided, the bypass valve device is furthermore preferably likewise in its first valve position in said initial position. To regenerate the storage device of the exhaust line part, the bypass valve device is then controlled by the closed-loop and/or open-loop control device such that the exhaust gas flow through the bypass device is at least partially enabled by the bypass valve device after the decoupling of the exhaust line part. Thus, the exhaust gas flow cannot flow through the bypass device in the initial position. To regenerate the storage device of the exhaust line part, some of the exhaust gas flow can be introduced into the decoupled exhaust line part.

The object of the invention is also met by a vehicle, in particular a watercraft, having the exhaust gas aftertreatment system according to the invention and/or for carrying out the method according to the invention. The resulting advantages are identical with the already acknowledged advantages of the exhaust gas aftertreatment system according to the invention and of the method according to the invention, and therefore these are not repeated here.

The advantageous embodiments and/or developments of the invention which are explained above and/or described in the dependent claims can be used individually or in any combination with one another, apart from those cases of univocal dependency relationships or incompatible alternatives, for example.

BRIEF DESCRIPTION OF THE DRAWINGS

The invention and the advantageous embodiments and developments thereof and the advantages thereof are explained in greater detail below, purely by way of example, by means of drawings, in which.

DETAILED DESCRIPTION OF THE PREFERRED EMBODIMENTS

Figure 1:
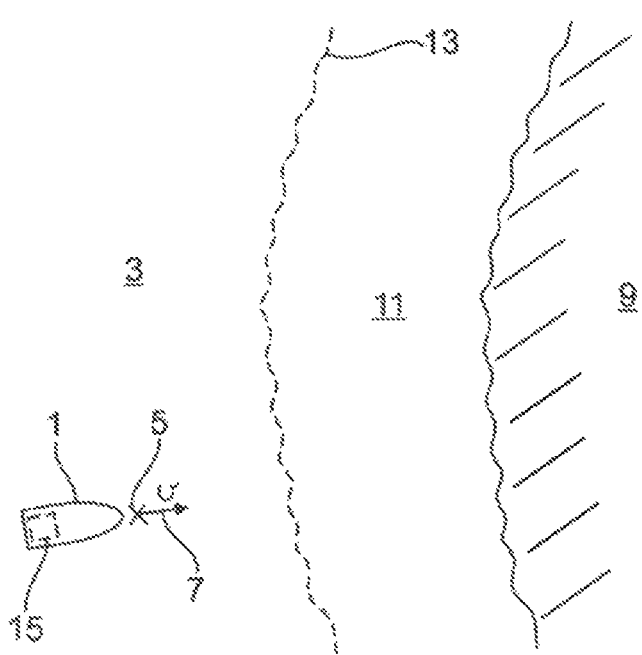
FIG. 1 shows a ship in a coastal region in a schematic illustration from above.

A vehicle designed, by way of example, as a ship 1 is shown in FIG. 1, said vehicle being on a body of water 3 in a position 5 and moving towards a coast 9 in a direction of travel 7 at a speed v. In an inshore region of the body of water 3 there is an "Emission Controlled Area" 11 (ECA), which extends over a defined distance from the coast 9 to a boundary 13 indicated by a dashed line. In the illustration shown in FIG. 1, the ship 1 is still outside the ECA 11, but is on the way into the ECA 11. In the inshore ECA 11, the applicable exhaust regulations for the ship 1 are stricter than outside the ECA 11 on the body of water 3. Thus, significantly lower sulphur emissions are permissible in the ECA 11 than outside the ECA 11, for example. In order to comply with the exhaust regulations in the ECA 11, a drive system 15 (indicated by dashed lines in FIG. 1) of the ship 1 has an exhaust gas aftertreatment system 17 (FIG. 2), by which the sulphur pollutants contained in the exhaust gas from the drive system 15 are reduced in an effective manner.

The construction and operation of the drive system 15 is explained in greater detail below with reference to FIG. 2.

Figure 2:
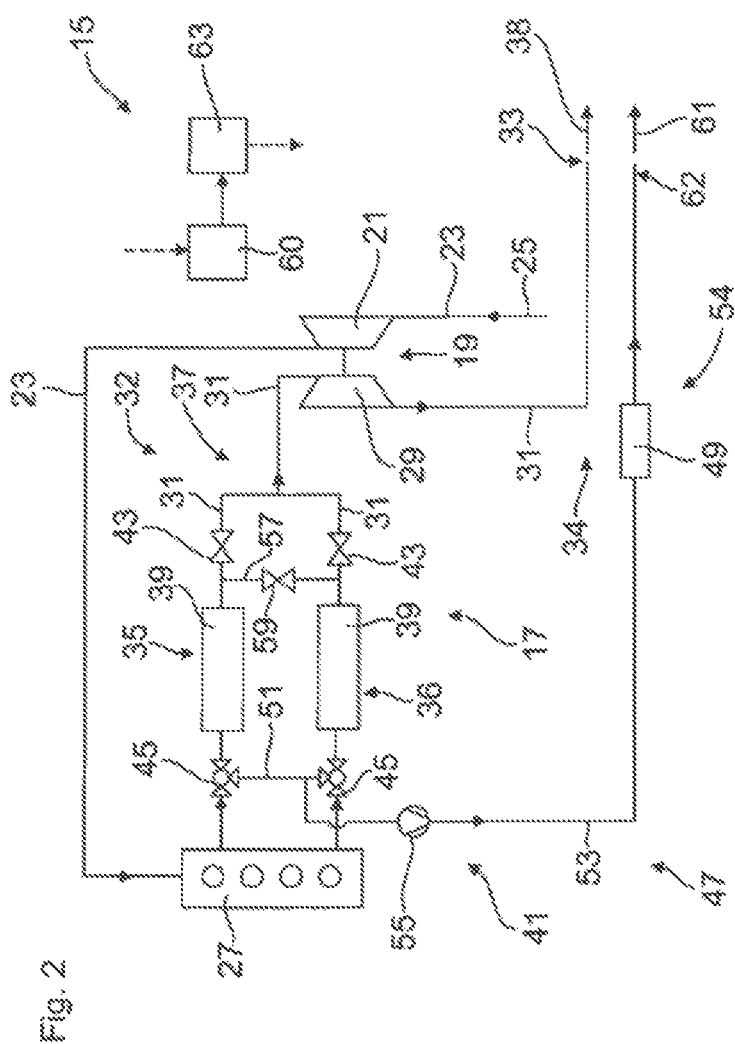
FIG. 2 shows a first embodiment of an exhaust gas aftertreatment system of the ship in a schematic illustration.

As shown in FIG. 2, the drive system 15 has an exhaust turbocharger 19 having a compressor 21, which is arranged in an intake tract 23 of the drive system 15. By the intake tract 23, combustion air (arrow 25) is first of all fed to the compressor 21 of the exhaust turbocharger 19, then compressed by the compressor 21 and finally fed to a combustion engine 27 of the drive system 15. The exhaust turbocharger 19 furthermore also has a turbine 29, which is arranged in an exhaust line 31 of the exhaust gas aftertreatment system 17 and is driven in a conventional manner by the exhaust gas flow from the combustion engine 27 flowing through the exhaust line 31. The use of the exhaust turbocharger 19 means that the exhaust line 31 upstream of the turbine 2 is designed as a high-pressure region 32, in which the exhaust gas has a higher pressure than in a low-pressure region 34 of the exhaust line 31 downstream of the turbine 31. Downstream of the turbine 29, as viewed in the direction of flow of the exhaust gas, the exhaust line 31 furthermore has an outlet opening 33, at which a purified exhaust gas 38 flows out of the exhaust line 31.

Upstream of the turbine 29, as seen in the direction of flow of the exhaust gas, the exhaust line 31 has a plurality of exhaust line parts 35, 36, in this case, by way of example, two exhaust line parts, through which the exhaust gas flows in parallel and which are connected fluidically to the combustion engine 27 by an exhaust manifold and are brought together again in a connecting region 37 of the exhaust line 31. Here, a storage device 39, by which at least some of the sulphur pollutants contained in the exhaust gas are put into intermediate storage for a defined period of time, is arranged in each of the exhaust line parts 35, 36. Specifically, the storage devices 39 in the embodiment of the exhaust gas aftertreatment system 15 shown in FIG. 2 are designed as sorption elements, by which the sulphur pollutants in the exhaust gas which are flowing past the storage devices 15 are sorbed. In this arrangement, the storage device 39 can be produced from a sorption material, e.g., from a zeolite, calcium or barium, for example, or, alternatively, can be coated with a sorption material.

The storage devices 39 designed as sorption elements can furthermore also be regenerated or freed from sulphur pollutants, for example, if this is required. Regeneration may be necessary, for example, if a large quantity of sulphur pollutants has been stored in the storage devices 39 and, as a result, the sorption characteristics of the storage devices 39 decline. To regenerate the storage devices 39, an extraction device 41 is provided here, by which the sulphur pollutants stored in the storage devices 39 can initially be extracted or removed from the exhaust line 31.

By way of example, the extraction device 41 has two straightway valves 43 and two multi-way valves 45, wherein a straightway valve 43 is arranged downstream of the storage device 39 and a multiway valve 45 is arranged upstream of the storage device 39 in each exhaust line part 35, 36. In a first valve position of the respective straightway valve 43, an exhaust gas flow through the respective straightway valve 43 is enabled. In a second valve position of the respective straightway valve 43, an exhaust gas flow through the respective straightway valve 43 is shut off. In a first valve position of the respective multiway valve 45, only an exhaust gas flow from the combustion engine 27 into the respective exhaust line part 35 is enabled. In a second valve position of the respective multiway valve 45, only an exhaust gas flow from the respective exhaust line part 35 into a connecting element 47 of the extraction device 41, said connecting element being connected to the multiway valves 45, is enabled.

If, therefore, both the straightway valve 43 and the multiway valve 45 of one of the two exhaust line parts 35 or 36 are in the second valve positions thereof, this exhaust line part 35 or 36 is decoupled fluidically from the exhaust gas flow. If both the straightway valve 43 and the multiway valve 45 of one of the two exhaust line parts 35 or 36 are in the first valve positions thereof, this exhaust line part 35 or 36 is not decoupled from the exhaust gas flow.

The exhaust line parts 35, 36 can furthermore be connected fluidically by the connecting element 47 to a reactor device 49 of the exhaust gas aftertreatment system 17. Specifically, by way of example, the connecting element 47 here has a first pipe element 51 connected to both multiway valves 45 and a second pipe element 53 connected to the first pipe element 51 and to the reactor device 49. Moreover, the extraction device 41 also has a delivery device 55 assigned to the second pipe element 53, e.g., a pump, by which an exhaust gas flow can be delivered from the exhaust line parts 35 towards the reactor device 49.

The connecting element 47 and the reactor device 49 furthermore form a low-pressure region 54, which has a similar pressure level to the low-pressure region 34 of the exhaust line 31. In the second valve position of the multiway valves 45, the exhaust line parts 35, 36 are therefore relieved of pressure.

The extraction device 41 furthermore also has a bypass device 57, by which the exhaust line parts 35, 36 downstream of the storage devices 39 and upstream of the connecting region 37 can be connected fluidically to one another. The bypass device 57 has a bypass valve device, in this case, by way of example, a continuously variable straightway valve 59, by which the exhaust gas flow through the bypass device 57 can be shut off and at least partially enabled.

The sulphur pollutants extracted or removed from the exhaust line 31 by the extraction device 41 can be converted into harmless substances by the reactor device 49. For this purpose, the reactor device 49 can have a pollutant scrubber and/or a fixed bed reaction element, by way of example. As an alternative and/or in addition, the reactor device for converting the sulphur pollutants can also have a cooling device and a condensation device for cooling and condensing the sulphur pollutants. In this way, the sulphur pollutants are then oxidized to give sulphuric acid. The precipitation of condensate by the cooling device and of the condensation device leads to the formation of sulphurous acid and sulphur dioxide, which are then oxidized with oxygen to give sulphuric acid. To improve oxidation, a feed device is preferably provided here, by which oxygen is fed to the cooling device and/or to the condensation device. Oxidation of the sulphurous acid can furthermore preferably be improved by a suitable catalyst, in particular a catalyst containing vanadium and/or cerium and/or an alkali and/or alkaline earth metal.

The drive system 15 also includes a measurement and/or control device 60, by which the quantities of sulphur pollutants stored in the storage devices 39 can be determined. The measurement and/or control device 60 is furthermore connected in a manner which allows data transmission to a closed-loop and/or open-loop control device 63, by which the straightway valves 43, the multiway valves 45, straightway valve 59 and the delivery device 55 are here controlled in a self-acting or automatic way in accordance with the quantities of sulphur pollutants stored in the storage devices 39. By the closed-loop and/or open-loop control device 63, the exhaust gas aftertreatment system 17 can be put into three modes of operation as explained below.

Figure 3:
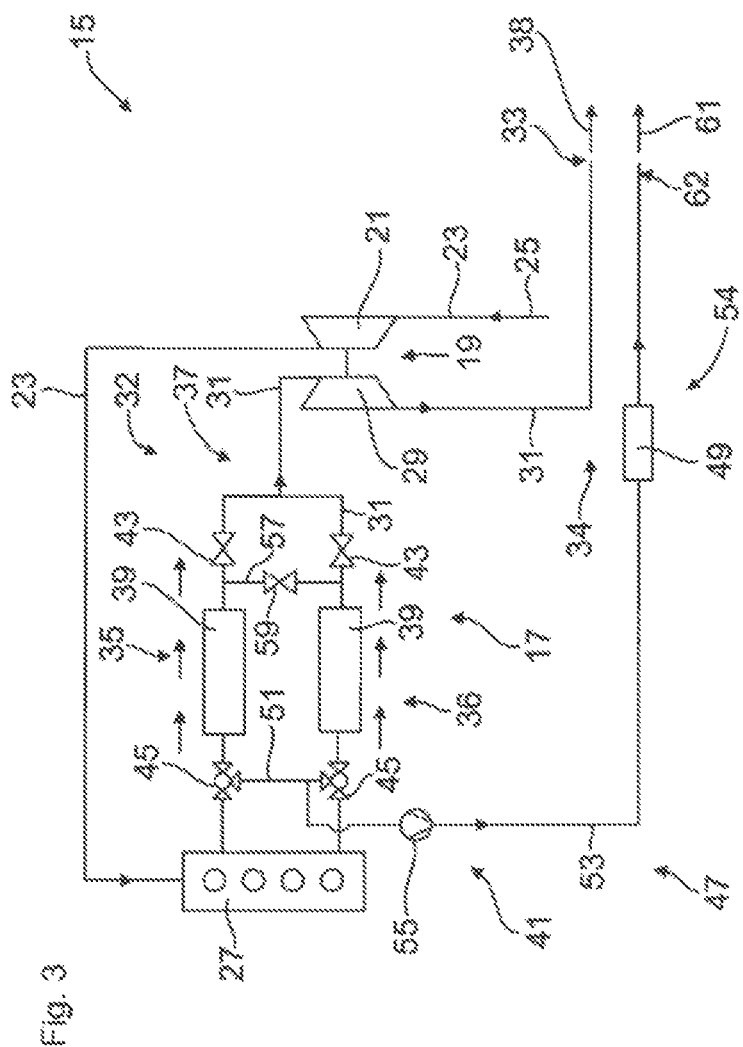
FIG. 3 shows a first mode of operation of the exhaust gas aftertreatment system in an illustration in accordance with FIG. 2.

In FIG. 3, the exhaust gas aftertreatment system 17 is shown in a conventional, first mode of operation, in which the sulphur pollutants in the exhaust gas are sorbed by the storage devices 39 in the exhaust line parts 35, 36. In this case, the straightway valves 43 and the multiway valves 45 are in the first valve positions thereof, with the result that the exhaust gas flow from the combustion engine 27 to the turbine 29 is enabled and the exhaust gas flow into the connecting element 47 is shut off. Moreover, the continuously variable straightway valve 59 is in the shut-off position thereof, with the result that the exhaust gas flow through the bypass device 57 is also shut off. This position of the valves is referred to as the initial position. Here, the delivery device 55 is furthermore deactivated.

Figure 4:
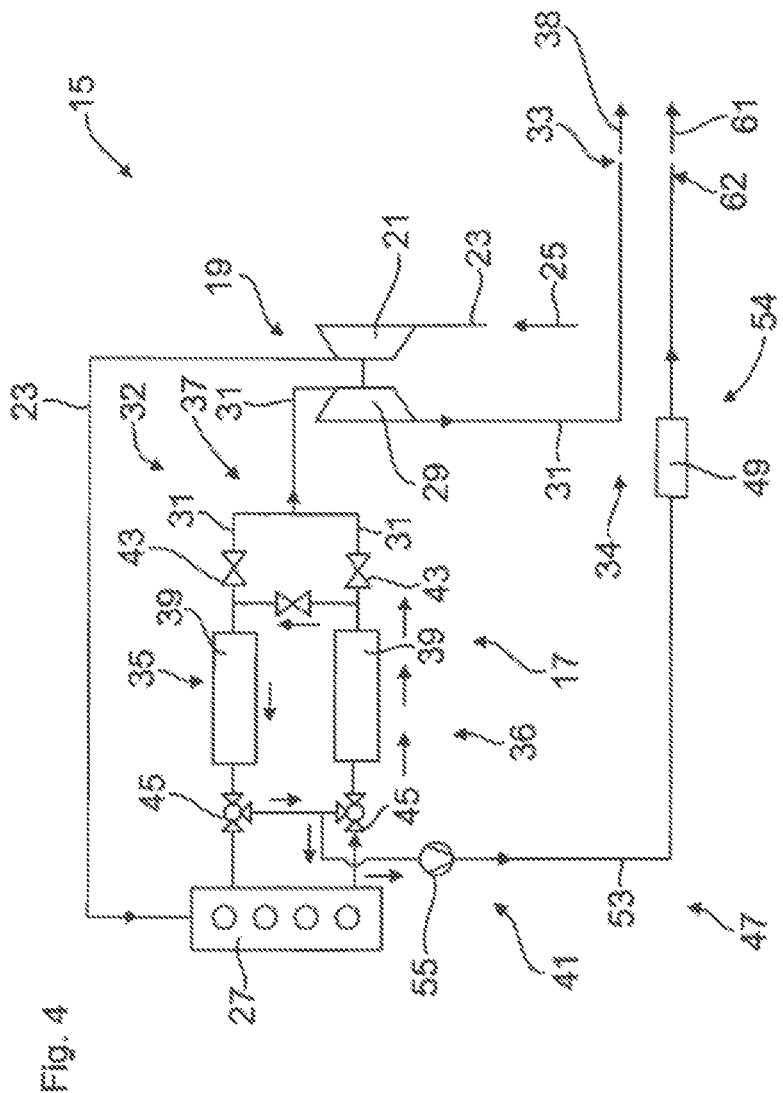
FIG. 4 shows a second mode of operation of the exhaust gas aftertreatment system in an illustration in accordance with FIG. 2.

FIG. 4 shows a second mode of operation of the exhaust gas aftertreatment system 17, in which the storage device 39 of exhaust line part 35 is being regenerated. In this case, the straightway valve 43 and the multiway valve 45 of exhaust line part 35 are in the second valve positions thereof, with the result that the exhaust gas flow from the combustion engine 27 to the turbine 29 via exhaust line part 35 is shut off and the exhaust gas flow from exhaust line part 35 into the connecting element 47 is enabled. Moreover, the straightway valve 43 and the multiway valve 45 of exhaust line part 36 are in the first valve positions thereof, with the result that the exhaust gas flow from the combustion engine 27 to the turbine 29 via exhaust line part 36 is enabled and the exhaust gas flow from exhaust line part 36 into the connecting element 47 is shut off. Here, the continuously variable straightway valve 59 is furthermore at least partially open, with the result that the exhaust gas flow through the bypass device 57 is at least partially enabled. The delivery device 55 is furthermore activated here.

The pressure relief in exhaust line part 35 causes desorption or release of the sulphur pollutants stored in the storage device 39 in exhaust line part 35. A vacuum, by which desorption of the sulphur pollutants is further improved or accelerated, is furthermore produced here by the delivery device 55. Together with the exhaust gas passed via the bypass device 57, the sulphur pollutants released are fed by the delivery device 55 to the reactor device 49, where the sulphur pollutants are converted into harmless substances (arrow 61) and are passed out of the exhaust gas aftertreatment system 17 at an outlet opening 62. After regeneration of the storage device 39 in exhaust line part 35, the exhaust gas aftertreatment system 17 is put back into the first mode of operation, which is shown in FIG. 3.

Figure 5:
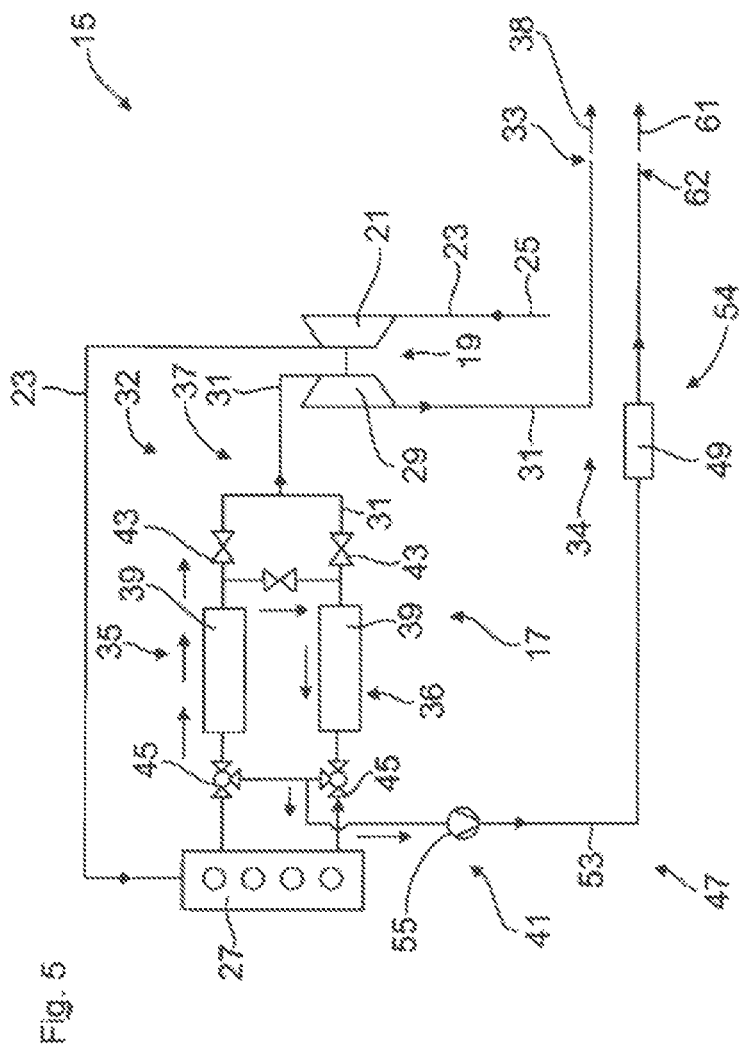
FIG. 5 shows a third mode of operation of the exhaust gas aftertreatment system in an illustration in accordance with FIG. 2.

The procedure by which the storage device 39 in exhaust line part 36 is regenerated in a third mode of operation of the exhaust gas aftertreatment system 17 is analogous to that by which the storage device 39 in exhaust line part 35 is regenerated in the second mode of operation of the exhaust gas aftertreatment system 17. This third mode of operation is shown in FIG. 5.

Figure 6:
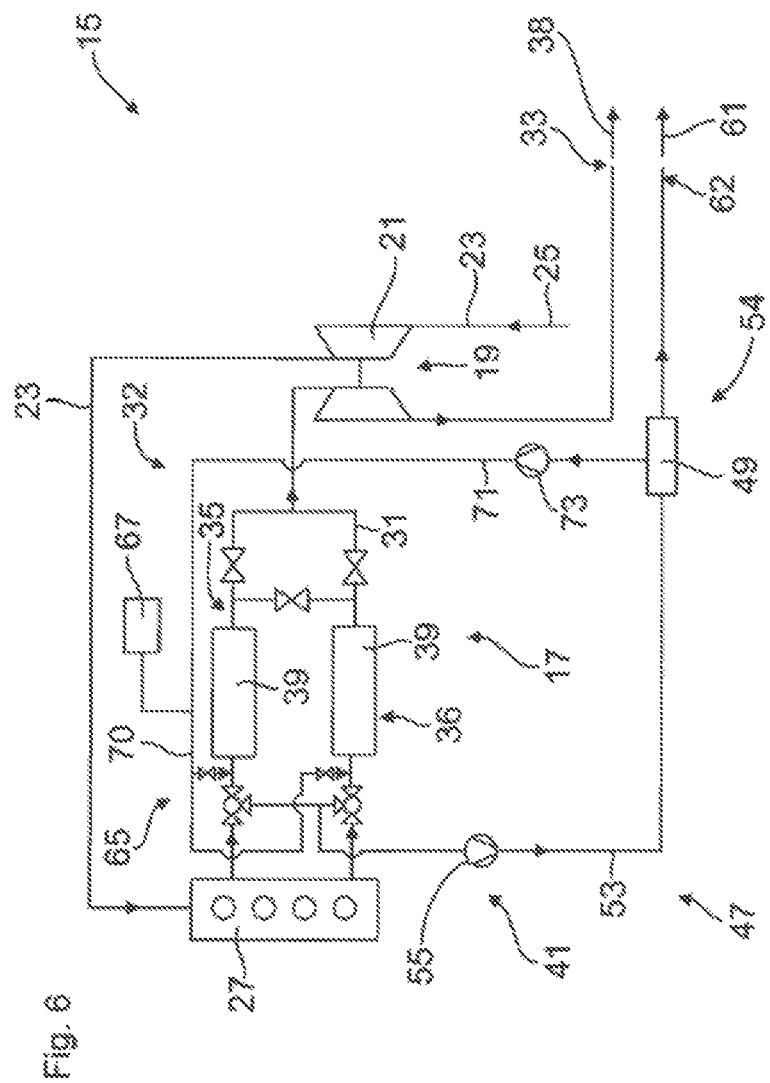
FIG. 6 shows a second embodiment of the exhaust gas aftertreatment system in an illustration in accordance with FIG. 2.

A second embodiment of the exhaust gas aftertreatment system 17 is shown in FIG. 6. In this embodiment, the storage devices 39 of the exhaust gas aftertreatment system 17 are not designed as sorption elements but as filter elements, by which sulphur pollutants converted into solids can be filtered out of the exhaust gas flow and stored. To convert the gaseous sulphur pollutants into solids, a feed device 65 is provided, by which a reagent stored in a storage container 67, in this case, by way of example, an aqueous urea solution, can be fed into the exhaust line parts 35, 36 downstream of the multiway valves 45 and upstream of the storage devices 39. After the aqueous urea solution has been fed into the exhaust line parts 35, 36, the aqueous urea solution mixes with the exhaust gas and heats up owing to the high exhaust gas temperatures in such a way that it is converted into ammonia. The ammonia then reacts with the gaseous sulphur pollutants in the exhaust gas to form the solids ammonium sulphate and ammonium hydrogen sulphate, for example.

Owing to the high exhaust gas temperatures, this reaction can only take place by virtue of the high pressure in the high-pressure region 32 of the exhaust line 31. If the exhaust line parts 35, 36 are relieved of pressure, the substances stored in the storage devices 39 are converted back into the gaseous sulphur pollutants. Here, regeneration of the storage devices 39 can be accomplished in a manner identical to that in the case of the first embodiment of the exhaust gas aftertreatment system 17, shown in FIGS. 1 to 5.

Here, as an option, the storage devices 39 can additionally also be designed as SCR catalysts, by which the nitrogen emissions contained in the exhaust gas from the combustion engine 27 can be reduced. In this case, the reduction in nitrogen emissions is accomplished by the aqueous urea solution introduced into the exhaust line parts 35, 36. If at least one SCR catalyst is arranged in the exhaust line 31 downstream of the storage devices 35, as seen in the direction of flow of the exhaust gas, the quantity of aqueous urea solution fed in by the feed device 65 is preferably such that there is sufficient aqueous urea solution for the storage of the sulphur pollutants in the storage devices 39 and sufficient aqueous urea solution to reduce the nitrogen oxides in the SCR catalyst.

Specifically, in the embodiment of the exhaust gas aftertreatment system 17 shown in FIG. 6, the feed device 65 has a pipe element 70 which is connected directly to the storage container 67 and to the exhaust line parts 35, 36.

In the embodiment shown in FIG. 6, the exhaust gas aftertreatment system 17 furthermore has a bypass device 71, by which the ammonia removed from the exhaust line 31 by the extraction device 41 can be fed back to the feed device 65. Here, the bypass device 71 is connected, by way of example, to the reactor device 49 and to pipe element 70 and has a delivery device 73, e.g., a pump, by which the ammonia released or removed from the sulphur pollutants can be delivered from the reactor device 49 into pipe element 70.

Figure 7:
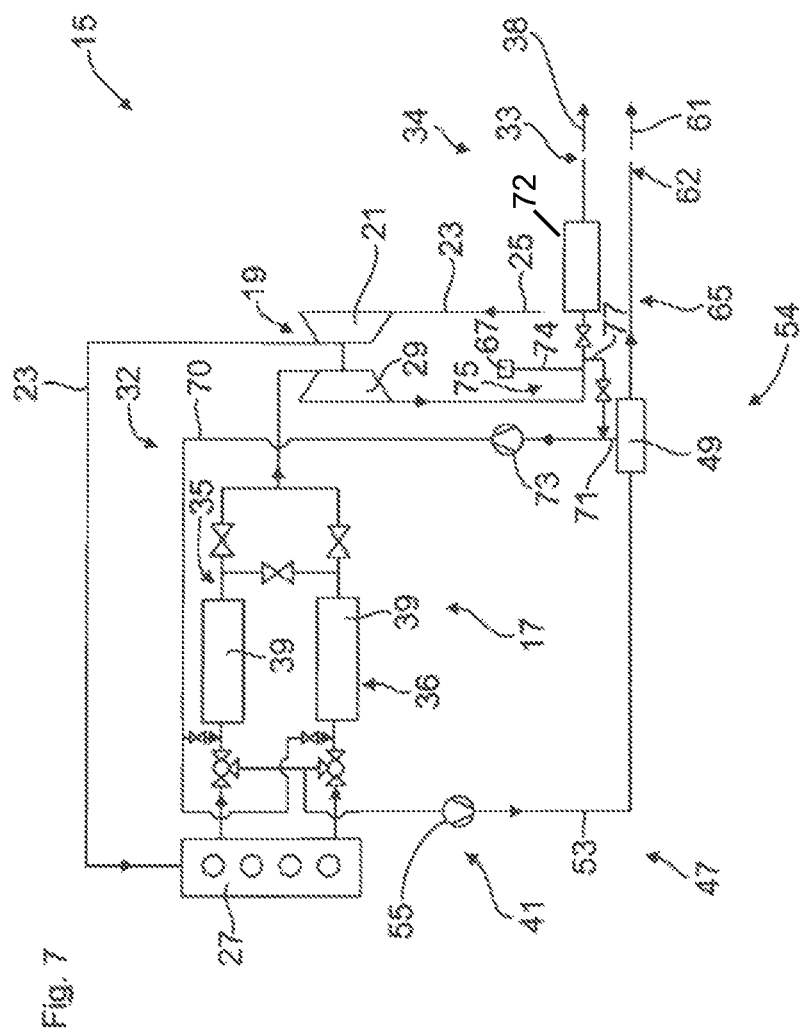
FIG. 7 shows a third embodiment of the exhaust gas aftertreatment system in an illustration in accordance with FIG. 6.

A third embodiment of the exhaust gas aftertreatment system 17 is shown in FIG. 7. In this embodiment, in contrast to the second embodiment shown in FIG. 6, an SCR catalyst 72, by which the nitrogen emissions contained in the exhaust gas can be reduced, is arranged in the exhaust line 31 downstream of the turbine 29. Here, the feed device 65 has a pipe element 74, which is connected to the storage container 65 and by which the aqueous urea solution stored in the storage container 65 is introduced into the exhaust line 31 downstream of the turbine 29 in a feed region 75. Moreover, the feed device 65 here also has a pipe element 77, which is connected to the exhaust line 31 and to pipe element 70 downstream of the feed region 75 and upstream of the SCR catalyst 72. Here, the feed device 73 is assigned to pipe element 70.

With this construction, the aqueous urea solution is first of all introduced into the exhaust line 31 in the feed region 75 by pipe element 74, allowing the aqueous urea solution to mix with the exhaust gas in the exhaust line 31. Some of the aqueous urea solution mixed with the exhaust gas is then introduced into pipe element 70 by pipe element 77. Finally, the aqueous urea solution is fed into the storage devices 39 by pipe element 70.

Figure 8:
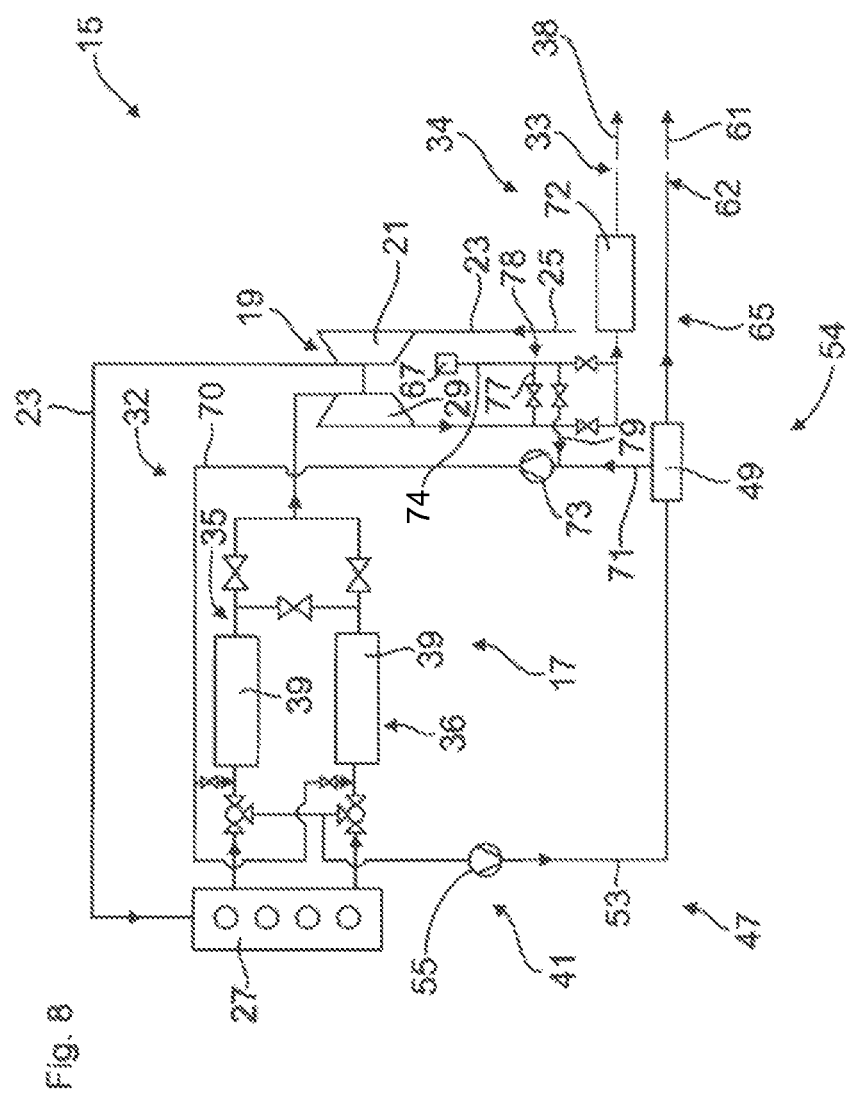
FIG. 8 shows a fourth embodiment of the exhaust gas aftertreatment system in an illustration in accordance with FIG. 7.

A fourth embodiment of the exhaust gas aftertreatment system 17 is shown in FIG. 8. In this embodiment, in comparison with the third embodiment shown in FIG. 7, the pipe element 77 is not connected to the exhaust line 31 but is connected to pipe element 74 in a feed region 78. Moreover, the feed device 65 here has a pipe element 79, which is connected to pipe element 70 and, upstream of the feed region 78, to pipe element 74.

By virtue of this construction, some of the exhaust gas flow is introduced into pipe element 77 and fed to pipe element 74. In pipe element 74, the exhaust gas can mix with the aqueous urea solution from the storage container 65. Some of the aqueous urea solution mixed with the exhaust gas is then introduced by pipe element 79 into pipe element 70, via which the aqueous urea solution is fed to the exhaust line parts 35, 36.

In comparison with the embodiment shown in FIG. 7, this fourth embodiment has the advantage that the mixing of the exhaust gas and the aqueous urea solution takes place in pipe element 74 of the feed device 65 and not in the exhaust line 31. Here, the mixture of exhaust gas and aqueous urea solution has a significantly higher proportion of aqueous urea solution since only some of the exhaust gas flow is delivered into pipe element 74. As a result, significantly less exhaust gas has to be delivered to the exhaust line parts 35, 36 here in order to supply the exhaust line parts 35, 36 with adequate aqueous urea solution. Thus, the delivery device 73, for example, can then be given smaller dimensions or operated with a lower delivery capacity.

Figure 9:
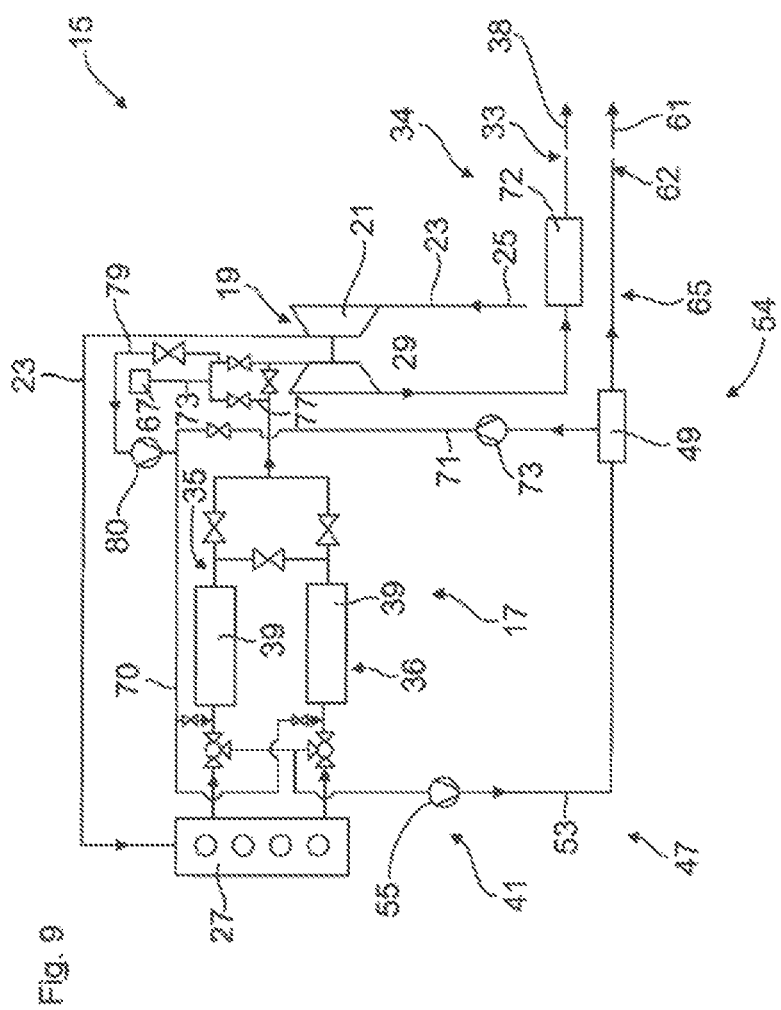
FIG. 9 shows a fifth embodiment of the exhaust gas aftertreatment system in an illustration in accordance with FIG. 8.

A fifth embodiment of the exhaust gas aftertreatment system 17 is shown in FIG. 9. In this embodiment of the exhaust gas aftertreatment system 17, in comparison with the fourth embodiment shown in FIG. 8, the feed device 65 is not connected to the exhaust line 31 downstream of the turbine 29 but downstream of the exhaust line parts 35, 36 and upstream of the turbine 29. Moreover, the delivery device 73 is here assigned to the bypass device 71, and an additional delivery device 80 assigned to pipe element 79 is provided. Otherwise, the construction of the fifth embodiment is identical with the construction of the fourth embodiment shown in FIG. 8.

In the fifth embodiment of the exhaust gas aftertreatment system 17, it is advantageous that the mixing of the exhaust gas and the aqueous urea solution takes place in the high-pressure region 32 of the exhaust line 31. The exhaust gas/urea mixture formed in the feed device 65 thus has an identical or similar pressure level to the exhaust gas in the exhaust line parts 35, 36 and can therefore be delivered into the exhaust line parts 34, 35 by the delivery device 80 with significantly less effort or with less delivery capacity.

Figure 10:
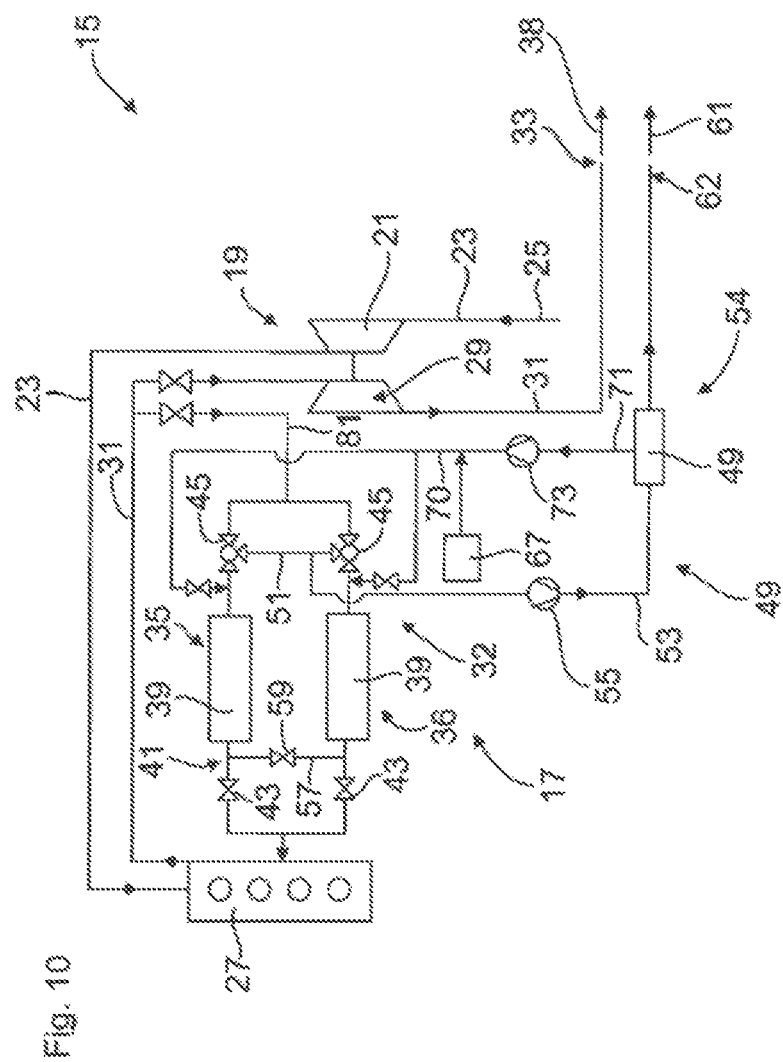
FIG. 10 shows a sixth embodiment of the exhaust gas aftertreatment system in an illustration in accordance with FIG. 6.

A sixth embodiment of the exhaust gas aftertreatment system 17 is shown in FIG. 10. In this embodiment of the exhaust gas aftertreatment system 17, in contrast to the embodiments shown in FIGS. 1 to 9, the exhaust gas aftertreatment system 17 has an exhaust gas recirculation system 81, by which some of the exhaust gas emitted by the combustion engine 27 is fed back to the combustion engine 27. Moreover, the exhaust line parts 35, 36 in this sixth embodiment are arranged in the exhaust gas recirculation system 81. Here, the exhaust line parts 35, 36 are designed in such a way that their mode of operation is identical to that of the embodiments shown in FIGS. 1 to 9. In other respects, the construction of the sixth embodiment shown in FIG. 10 corresponds to the construction of the second embodiment shown in FIG. 6.

LIST OF REFERENCE SKINS 1 ship
3 body of water
5 position
7 direction of travel
9 coast
11 ECA
13 boundary
15 drive system
17 exhaust gas aftertreatment system
19 exhaust turbocharger
21 compressor
23 intake tract
25 combustion air
27 combustion engine
29 turbine
31 exhaust line
32 high-pressure region
33 outlet opening
34 low-pressure region
35 exhaust line part
36 exhaust line part
37 connecting region
38 exhaust gas
39 storage device
41 extraction device
43 straightway valve
45 multiway valve
47 connecting element
49 reactor device
51 first pipe element
53 second pipe element
54 low-pressure region
55 delivery device
57 bypass device
59 straightway valve
60 measurement and/or control device
61 harmless substances
62 outlet opening
63 closed-loop and/or open-loop control device
65 feed device
67 storage container
70 pipe element
71 bypass device
72 SCR catalyst
73 delivery device
74 pipe element
75 feed region
77 pipe element
78 feed region
79 pipe element
80 delivery device
81 exhaust gas recirculation system

The invention claimed is:

1. An exhaust gas aftertreatment system for a vehicle operated by a combustion engine comprising:
a turbine of an exhaust gas turbocharger, arranged in an exhaust line of the combustion engine, wherein the exhaust line is designed as a high-pressure region upstream of the turbine and as a low-pressure region downstream of the turbine, as seen in the direction of the exhaust gas flow, said low-pressure region being at a lower pressure than the high-pressure region, and
at least one storage device in which a sulphur pollutant contained in exhaust gas of the exhaust gas flow is at least one of stored and put into intermediate storage, for a defined period of time, wherein for storing the sulphur pollutants in the high-pressure region, the at least one storage device is arranged in the exhaust line upstream of the at least one turbine;
wherein the at least one storage device is one of:
a sorption element, by which the sulphur pollutants can be sorbed, the storage device being made of a sorption material or coated with a sorption material; or
a filter element with a storage container storing a reagent and a feed device supplying the reagent from the storage container to the exhaust gas upstream of the filter element, the reagent converting the sulphur pollutant contained in the exhaust gas into solids.

2. The exhaust gas aftertreatment system according to claim 1, wherein the vehicle is a watercraft.

3. The exhaust gas aftertreatment system according to claim 1, wherein the at least one storage device is the sorption element.

4. The exhaust gas aftertreatment system according to claim 1, wherein the at least one storage device is the filter element filtering out and storing the sulphur pollutant converted into solids out of the exhaust gas flow.

5. The exhaust gas aftertreatment system according to claim 4, further comprising an SCR catalyst, wherein the reagent is ammonia or a precursor of ammonia and is fed to the SCR catalyst by the feed device.

6. The exhaust gas aftertreatment system according to claim 5, wherein the at least one storage device includes the SCR catalyst.

7. The exhaust gas aftertreatment system according to claim 5, further comprising a single feed region feeding the reagent into the exhaust gas to both the storage device and the SCR catalyst, the SCR catalyst being arranged in the exhaust line downstream of the storage device.

8. The exhaust gas aftertreatment system according to claim 7, wherein the feed region is arranged in the exhaust line upstream of at least one of the turbine and the storage device.

9. The exhaust gas aftertreatment system according to claim 1, wherein the exhaust line includes an exhaust gas recirculation system feeding back the exhaust gas to the combustion engine, and the storage device is arranged in at least one of the exhaust gas recirculation system and the exhaust line upstream of the exhaust gas recirculation system.

10. The exhaust gas aftertreatment system according to claim 1, further comprising an extraction device extracting or removing the stored sulphur pollutant from the exhaust line and a reactor device, wherein the extracted or removed sulphur pollutants are fed to the reactor device, in which the sulphur pollutant is converted into a defined substance.

11. The exhaust gas aftertreatment system according to claim 10, wherein the exhaust line includes two exhaust line parts through which the exhaust gas flows in parallel, at least one storage device is arranged in each of exhaust line parts, and in that, for fluidic decoupling of the exhaust line parts from the exhaust gas flow, the extraction device includes a decoupling valve device, which decouples neither of the two exhaust line parts in a first valve position, decouples a first of the two exhaust line parts in a second valve position, and decouples a second of the two exhaust line parts in a third valve position.

12. The exhaust gas aftertreatment system according to claim 11, wherein the extraction device includes at least one relief valve device relieving the exhaust line parts of pressure, wherein the at least one relief valve device relieves neither of the two exhaust line parts in a first valve position, relieves the first of the two exhaust line parts in a second valve position, and relieves the second of the two exhaust line parts in a third valve position.

13. The exhaust gas aftertreatment system according to claim 12, wherein the extraction device has at least one connecting element connected between the exhaust line parts upstream of the at least one storage device of each of the exhaust line parts, and a connecting valve device that selectively connects the exhaust line parts to the reactor device, the connecting valve device shuts off the exhaust gas flow through the connecting element in a first valve position, enables the exhaust gas flow from the first of the two exhaust line parts towards the reactor device in a second valve position, and enables the exhaust gas flow from the second of the two exhaust line parts towards the reactor device in a third valve position.

14. The exhaust gas aftertreatment system according to claim 12, wherein the extraction device has a bypass device connected between the exhaust line parts upstream of a connecting region of the exhaust line parts, and a bypass valve device in the bypass device that shuts off the exhaust gas flow through the bypass device in a first valve position and at least partially enables the exhaust gas flow through the bypass device in a second valve position.

15. The exhaust gas aftertreatment system according to claim 13, wherein the extraction device has at least one delivery device delivering exhaust gas from the exhaust line parts to the reactor device via the at least one connecting element.

16. The exhaust gas aftertreatment system according to claim 10, wherein the reactor device includes at least one of a pollutant scrubber, a fixed bed reaction element, and a cooling device and a condensation device for cooling and condensing the sulphur pollutant.

17. The exhaust gas aftertreatment system according to claim 10, further comprising a bypass device feeding back the reagent separated from the sulphur pollutant and removed from the exhaust line to the exhaust gas upstream of the at least one storage device.

18. The exhaust gas aftertreatment system according to claim 1, further comprising at least one of a measurement device and a control device that determines a quantity of the sulphur pollutant stored in the storage device using at least one of a sensor system and a simulation model.

19. A method for operating an exhaust gas aftertreatment system for a vehicle operated by a combustion engine, wherein the exhaust gas aftertreatment system includes a turbine of an exhaust gas turbocharger, arranged in an exhaust line of the combustion engine, wherein the exhaust line is designed as a high-pressure region upstream of the turbine and as a low-pressure region downstream of the turbine, as seen in the direction of the exhaust gas flow, said low-pressure region being at a lower pressure than the high-pressure region, and at least one storage device in which a sulphur pollutant contained in exhaust gas of the exhaust gas flow is at least one of stored and put into intermediate storage, for a defined period of time, wherein for storing the sulphur pollutants in the high-pressure region, the at least one storage device is arranged in the exhaust line upstream of the at least one turbine, wherein the at least one storage device is one of:
 a sorption element, by which the sulphur pollutants can be sorbed, the storage device being made of a sorption material or coated with a sorption material; or
 a filter element with a storage container storing a reagent and a feed device supplying the reagent from the storage container to the exhaust gas upstream of the filter element, the reagent converting the sulphur pollutant contained in the exhaust gas into solids,
 the method comprising:
 arranging the storage device in the exhaust line upstream of the turbine in the high-pressure region of the exhaust line, and
 storing or putting into intermediate storage the sulphur pollutant in the storage device, whereby the sulphur pollutant is stored or put into intermediate storage in the high-pressure region of the exhaust line.

20. The method according to claim 19, wherein the vehicle is a watercraft.

21. The method according to claim 19, further comprising extracting or removing with an extraction device the stored sulphur pollutant from the exhaust line, feeding the extracted or removed sulphur pollutant to a reactor device, and converting the sulphur pollutant into a defined substance in the reactor device.

22. The method according to claim 21, wherein the exhaust line includes two exhaust line parts through which the exhaust gas flows in parallel, at least one storage device is arranged in each of exhaust line parts, and in that, for fluidic decoupling of the exhaust line parts from the exhaust gas flow, the extraction device includes a decoupling valve device, which decouples neither of the two exhaust line parts in a first valve position, decouples a first of the two exhaust line parts in a second valve position, and decouples a second of the two exhaust line parts in a third valve position, wherein the extraction device includes at least one relief valve device relieving the exhaust line parts of pressure, wherein the at least one relief valve device relieves neither of the two exhaust line parts in a first valve position, relieves the first of the two exhaust line parts in a second valve position, and relieves the second of the two exhaust line parts in a third valve position, wherein the extraction device has at least one connecting element connected between the exhaust line parts upstream of the at least one storage device of each of the exhaust line parts, and a connecting valve device that selectively connects the exhaust line parts to the reactor device, the connecting valve device shuts off the exhaust gas flow through the connecting element in a first valve position, enables the exhaust gas flow from the first of the two exhaust line parts towards the reactor device in a second valve position, and enables the exhaust gas flow from the second of the two exhaust line parts towards the reactor device in a third valve position, and the decoupling valve device, the relief valve device, and the connecting valve device are in their first valve positions in an initial position of the exhaust aftertreatment system, the method further comprising the step of regenerating the storage device of one of the two exhaust line parts by controlling the decoupling valve device, the relief valve device, and the connecting valve device such by a control device so that the one of the two exhaust line parts is initially decoupled from the exhaust gas flow by the decoupling valve device, the one of the two exhaust line parts is then relieved of pressure by the relief valve device, and the exhaust gas flow from the one of the two exhaust line parts towards the reactor device is enabled by the connecting valve device.

23. The method according to claim 22, wherein the extraction device has a bypass device connected between the exhaust line parts upstream of a connecting region of the exhaust line parts, and a bypass valve device in the bypass device that shuts off the exhaust gas flow through the bypass device in a first valve position and at least partially enables the exhaust gas flow through the bypass device in a second valve position, and the bypass valve device is in its first valve position in the initial position of the exhaust aftertreatment system, and the step of regenerating further comprises controlling the bypass valve device by the control device such that the exhaust gas flow through the bypass device is at least partially enabled by the bypass valve device after the decoupling of the one of the two exhaust line parts.

24. A watercraft having an exhaust gas aftertreatment system according to claim 1.

* * * * *